Figure 1:
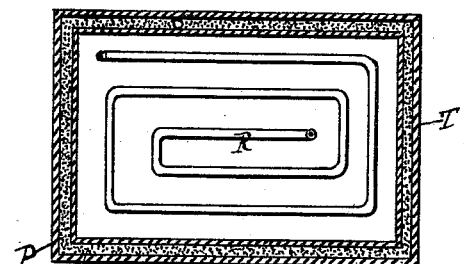
Figure 2:
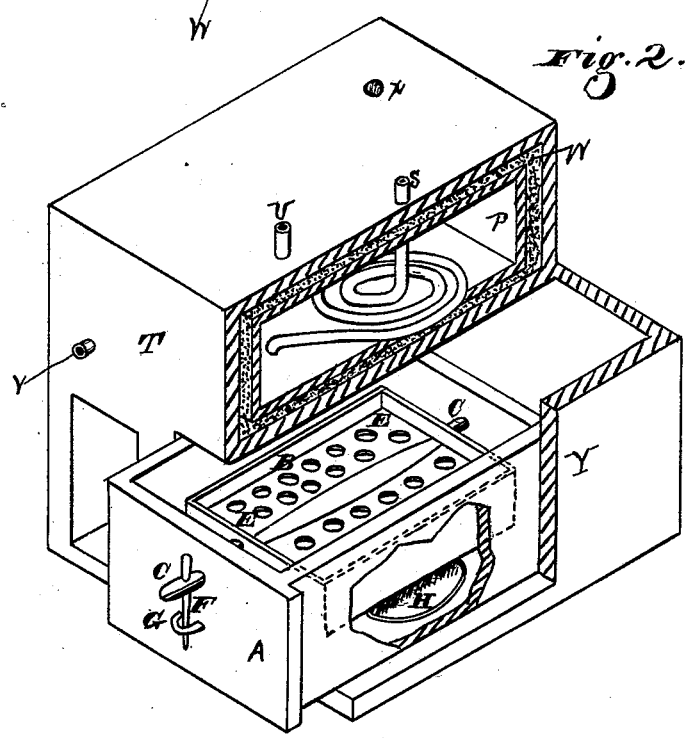
Figure 3:
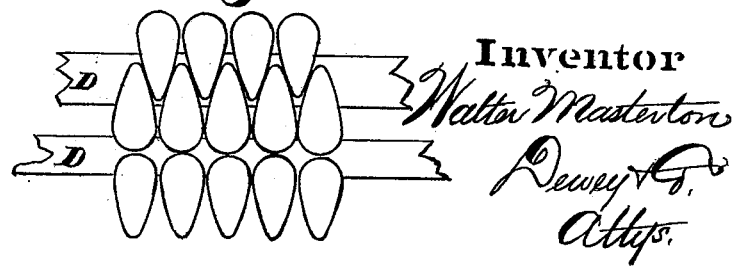

W. MASTERTON.
INCUBATOR.

No. 186,145. Patented Jan. 9, 1877.

Witnesses
Geo. H. Strong
J. L. Boone

Inventor
Walter Masterton
Dewey & Co.
Attys.

UNITED STATES PATENT OFFICE.

WALTER MASTERTON, OF STOCKTON, CALIFORNIA.

IMPROVEMENT IN INCUBATORS.

Specification forming part of Letters Patent No. 186,145, dated January 9, 1877; application filed September 4, 1876.

*To all whom it may concern:*

Be it known that I, WALTER MASTERTON, of the city of Stockton, in the county of San Joaquin and State of California, have invented an Improved Egg-Hatcher; and I do hereby declare the following to be a full, clear, and exact description thereof, reference being had to the accompanying drawings.

My invention relates to an improvement in incubators, which I will proceed to describe, reference being had to the accompanying drawings.

Before incubation begins, and during several days after it is begun, the germ of the future bird lies in the top of the egg. For this reason I apply the heat to the top of the eggs, and maintain a lower temperature at the bottom of them. Air is necessary to incubation, and passes freely through the pores in the shell of the egg during the process. For this reason I cause a current of air to circulate among the eggs continually. A current of dry, hot air passing through the eggs and out into the atmosphere continually will either destroy their vitality by excessive evaporation, or else impair it to such a degree that the birds will be feeble, and few of them will live till maturity. To prevent this I moisten the air with the vapor of water before it mingles with the eggs. Notwithstanding the moist air kept constantly about the eggs, evaporation actually takes place, and tends to stick the soft parts of the eggs to the shells. To prevent this, and for the further purpose of bringing the germ into contact with as large a portion of the egg as possible during the early part of incubation, I turn the eggs over once a day.

To accomplish these several parts of my general purpose I provide a vessel, P, of any convenient length and breadth, and about eight inches deep, made of sheet metal. Within the vessel I place a coil of pipe, R, secured in place to the bottom, and having an inlet through it, and an outlet, S, through the top. I nearly fill the vessel with water through a pipe, U, inserted in the top for that purpose, and heat it to the required temperature by a spirit or other lamp burning under the inlet end of the pipe. A suitable pipe, V, is inserted in the side near the bottom of the vessel, through which the water may be withdrawn at will. A thermometer is suspended in the outlet end of the pipe, reaching nearly to the bottom of the vessel of water to indicate the temperature. I place the said vessel of water within a wooden box, T, which is sufficiently larger to permit a thick stuffing or coating, W, of some non-conducting material to be placed between their sides and ends, and tops, and a hatching-chamber below the water-vessel, with a similar layer or coating of non-conducting material beneath it. Immediately below the water-vessel I place a sliding frame, A, and within it I suspend a box, B, on the journals C, to contain the eggs and revolve with them when I desire to turn them over. Before placing the eggs in the box I divide them into two classes: the first class includes all those of nearly the same size; the second class includes all those differing considerably in size. For the first class of eggs I construct the box with a perforated bottom. I place the eggs in it close together, in rows, turning the small ends of all the eggs in one row in the same direction, and of the next row in the opposite direction, and opposite the point of junction of the first row, alternately, until the box is full. This mode of packing insures great economy of space. The perforations are of less diameter than the smallest diameter of the eggs, and each perforation is opposite one egg. To secure the eggs in position while the box is being revolved, I attach narrow strips of different thicknesses of some soft elastic material, D, in the direction of the rows, and at suitable distances apart, so that the small ends of two rows rest upon a thick strip, and the large ends of two rows rest upon a thin strip, alternately. A movable top, E, for the box, having precisely corresponding perforations and narrow strips of soft material, is next pressed down upon the eggs, and fastened to the box by suitable devices, and this holds the eggs in proper position securely. For eggs of the second class I construct the bottom of the box of thin strips of board or metal, in the same direction as the rows of eggs, and slightly farther apart than the length of the eggs. Over the strips I fasten a net of twine or other soft material. Upon the net I place the eggs in rows, the same as in the first class, but not matching ends to spaces, nor permitting the ends to run past each other, as in that class. A movable top for the box, of similar strips and net, corresponding with the bottom, is then pressed down upon the eggs, and fastened suitably, and holds each egg in position, though differing in length and height from those beside it.

My reason for employing a perforated or net bottom and top for the egg-box is to present as much of the top surface of the eggs as possible to the direct heat of the water-vessel, and of the entire surface to the moist air, and at the same time facilitate the turning of the eggs. To turn the egg-box over without opening the incubator, I extend one of the journals C through the end of the sliding frame. To keep the box in position after turning it, I insert a pin, F, through the journal, into a staple, G, below it, which is driven into the end of the sliding frame. To ventilate the eggs properly I admit air through suitable apertures under the egg-box, at one end of it, and after traversing the length of the box it escapes through the top of the incubator-case at the other side. The next day I close the apertures, and open corresponding apertures at the other end of the egg-box and top of incubator, so the draft is in the opposite direction, alternately. To moisten the air I place an open shallow vessel, H, of water under the egg-box, from which the vapor ascends continually, and is carried among the eggs by the moving air. On the nineteenth day after the heat has been applied, I remove the movable top of the egg-box, and insert a movable bottom, full of small holes, close under the eggs, so the birds may have substantial support and direct connection with the fresh air.

Having thus described my invention, what I claim as new, and desire to secure by Letters Patent, is—

1. The wooden containing-box T, with its water-vessel P and heating-coil R in the upper part, having ventilating-apertures X through the top, in combination with the movable frame A, with its rotating egg-box B, having the perforated or open shelves E and the soft packing-strips D, substantially as and for the purpose herein described.

2. The sliding removable frame A, with its rotating egg-box B, having the journal C, extending through one side of the frame, and holding-pin F and staple G, the frame A being perforated below the box B at opposite ends, for the purpose of ventilating, substantially as herein described.

3. In combination with the frame A, with its rotary egg-box B, and heating and ventilating devices, as shown, the shallow water-vessel H, to supply moisture, substantially as herein described.

WALTER MASTERTON.

Witnesses:
HARRIS ARENDT,
PETER MILLER.